US008692941B2

(12) United States Patent
Horisawa

(10) Patent No.: US 8,692,941 B2
(45) Date of Patent: Apr. 8, 2014

(54) RECEIVING APPARATUS

(75) Inventor: Shozo Horisawa, Chiba (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 13/201,710

(22) PCT Filed: Feb. 4, 2010

(86) PCT No.: PCT/JP2010/052004
§ 371 (c)(1),
(2), (4) Date: Aug. 16, 2011

(87) PCT Pub. No.: WO2010/098212
PCT Pub. Date: Sep. 2, 2010

(65) Prior Publication Data
US 2011/0298989 A1 Dec. 8, 2011

(30) Foreign Application Priority Data

Feb. 27, 2009 (JP) ................................ P2009-045193

(51) Int. Cl.
*H04N 5/44* (2011.01)
(52) U.S. Cl.
USPC ...................... 348/725; 348/732; 348/E5.096

(58) Field of Classification Search
None
See application file for complete search history.

(56) References Cited

U.S. PATENT DOCUMENTS

2009/0096934 A1\* 4/2009 Nakajima et al. ............. 348/725

FOREIGN PATENT DOCUMENTS

| JP | 60-4076 A | 1/1985 |
|----|-----------|--------|
| JP | 2002-016988 A | 1/2002 |
| JP | 2005-210632 A | 8/2005 |
| JP | 2008-078896 A | 4/2008 |

\* cited by examiner

*Primary Examiner* — Jefferey Harold
*Assistant Examiner* — Sean Haiem
(74) *Attorney, Agent, or Firm* — Sony Corporation

(57) ABSTRACT

A receiving apparatus 10 efficiently receives radio waves used for wireless communication. Four sides of the periphery of a back cover 4 are bent inward. The reflector 5 formed of a metallic material is disposed on the bent portion on the inner side of a housing. When radio waves are transmitted from the front of the receiving apparatus 10, the radio waves are reflected by the reflector 5 disposed on the back cover 4 and are directed toward the inside of the housing. The directed radio waves are received by a radio module 3.

8 Claims, 15 Drawing Sheets

RECEIVING APPARATUS

CROSS-REFERENCES TO RELATED APPLICATIONS

The present application is a national phase entry under 35 U.S.C. §371 of International Application No. PCT/JP2010/052004 filed Feb. 4, 2010, published on Sep. 2, 2010 as WO 2010/098212 A1, which claims priority from Japanese Patent Application No. JP 2009-045193 filed in the Japanese Patent Office on Feb. 27, 2009.

TECHNICAL FIELD

The present invention relates to a receiving apparatus for receiving radio waves used for wireless communication.

BACKGROUND ART

In recent years, a wireless communication function has been integrated into television receivers. For example, as a remote controller (hereinafter also referred to as a "remote"), an infrared remote using an infrared communication method has been widely used. In addition, recently, a wireless remote using a radio communication method has been adopted for practical use. Furthermore, for example, with the decrease in thickness of television receivers, television receivers have a configuration in which a receiving unit is separated from a display unit and audio/video (AV) data is transmitted from the receiving unit to the display unit through wireless communication.

As shown in FIG. 1, an existing television receiver 100 has a bezel frame 120 made of a nonmetallic material that covers the peripheral portion of a display panel 110 made of a metallic material.

Even when, for example, a shielding material is disposed between the wireless remote, which is a transmitter, and the television receiver 100, which is a receiver, radio waves used for wireless communication can pass through the shielding material if the shielding material is nonmetallic. Accordingly, for example, as shown in FIG. 2, in such a television receiver 100, a radio module 130 including a radio receiving antenna is disposed on the back of the bezel frame 120 or in a gap formed in a status display region of the lower section of the television receiver 100 (for example, the status region displays the power status and timer status). By disposing the radio module 130 in this manner, sufficient reception performance can be provided.

Such a technique related to a wireless remote using a radio communication method is described in Japanese Unexamined Patent Application Publication No. 2002-16988.

SUMMARY OF INVENTION

Technical Problem

However, if a shielding material is disposed, the reception performance decreases, as compared with the case in which a shielding material is not disposed. FIG. 3 illustrates an example of the antenna gain obtained when a radio module is disposed in a gap formed in a status display region of the television receiver 100. In this graph, the angle in the circumferential direction represents a direction from the receiving antenna of the radio module 130. More specifically, a position at an angle of 0° represents the front direction of the television receiver 100. A position at an angle of 180° represents the back direction of the television receiver 100. In addition, the radial direction of the circle represents the level of the antenna gain, which indicates that the antenna gain increases from the inner peripheral side towards the outer peripheral side.

As described above, if a display panel 110 serving as a shielding material is disposed in the front direction of the radio module 130, the antenna gain in the front direction tends to be smaller than that in the back direction or the side direction.

In addition, as shown in FIG. 4, the latest television receiver 100' has a thinner profile and a thinner bezel frame 120' having a smaller width in order to provide a better-looking design. As a result, the area of the bezel frame 120' decreases and, therefore, it is difficult to dispose the radio module 130 on the back of the bezel frame 120' or a gap in the status display region as in existing television receivers.

To solve such a problem, a slit may be provided in the bezel frame 120' and a small external antenna may be disposed at the position of the slit. However, a small external antenna is significantly costly and, therefore, the cost of the television receiver disadvantageously increases.

Alternatively, to solve such a problem, the radio module 130 may be disposed on the edge face of the bezel frame 120'. However, if the radio module 130 is disposed on the edge face of the bezel frame 120', the reception performance decreases. In addition, the positions at which the radio module 130 can be disposed are disadvantageously limited. In addition, since the distance between the radio module 130 and a main board of the television receiver 100' is increased, the lengths of the interconnection lines between the radio module 130 and a main board of the television receiver 100' are increased. If the lengths of the interconnection lines are increased, the cost of the television receiver 100' disadvantageously increases. Furthermore, since the interconnection lines functions as antennas, unwanted radiation may disadvantageously occur.

Accordingly, it is an object of the present invention to provide a receiving apparatus capable of efficiently receiving radio waves used for wireless communication even when a bezel frame is made thinner.

Solution to Problem

To address the above-described issue, the present invention provides a receiving apparatus. The receiving apparatus includes a display panel configured to display video, a back cover configured to cover at least part of a back surface of the display panel, where the back cover has at least part of a peripheral portion that is bent inward, a receiving unit disposed on a front surface of the back cover, where the receiving unit receives radio waves used for wireless communication and transmitted from the outside, and a reflector disposed in the vicinity of a bent portion of the back cover, where the reflector reflects the radio waves transmitted from the outside and directs the radio waves to the receiving unit.

As described above, according to the present invention, a display panel configured to display video, a back cover that has at least part of a peripheral portion that is bent inward and that covers at least part of a back surface of the display panel, a receiving unit configured to receive radio waves used for wireless communication and transmitted from the outside, and a reflector disposed in the vicinity of a bent portion of the back cover and configured to reflect the radio waves transmitted from the outside and direct the radio waves to the receiving unit are provided. Accordingly, radio waves transmitted from the front of the receiving unit can be received.

Advantageous Effects of Invention

According to the present invention, radio waves used for wireless communication transmitted from the outside are reflected by a reflector disposed in a bent portion of a back cover and are directed to a receiving unit. Thus, radio waves transmitted in a front direction can be advantageously received efficiently.

In addition, according to the present invention, the receiving unit can be disposed at any location in the back cover. Therefore, the length of an interconnection line extending between the receiving unit and a circuit board can be decreased. As a result, the manufacturing cost can be advantageously decreased, and a problem of unwanted radiation can be advantageously improved.

DESCRIPTION OF EMBODIMENTS

An embodiment of the present invention is described below with reference to the accompanying drawings. According to an embodiment of the present invention, in order to efficiently receive radio waves used for wireless communication and transmitted from a transmitting unit, such as a wireless remote controller, a receiving apparatus includes a reflector. Note that in the following example, description is made with reference to a television receiver serving as a receiving apparatus capable of receiving digital television broadcast and a wireless remote controller serving as a transmitting unit.

[Configuration of Receiving Apparatus]

Figure 1:
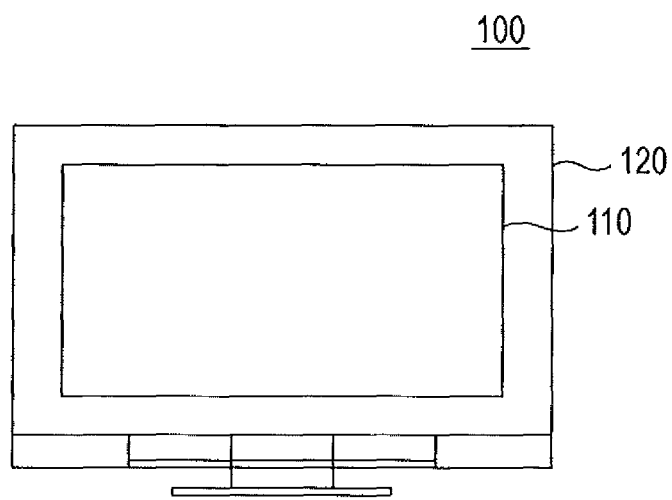
FIG. 1 is a schematic illustration of an external view of an example of an existing television receiver.
Figure 2:
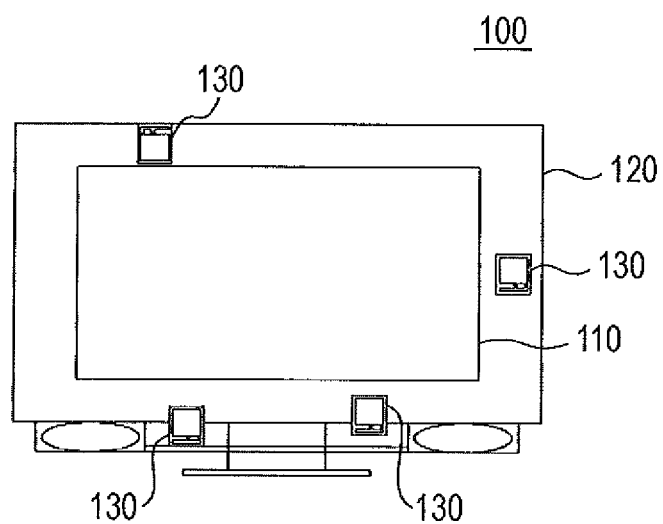
FIG. 2 is a schematic illustration of an example of the layout of a radio module.
Figure 3:
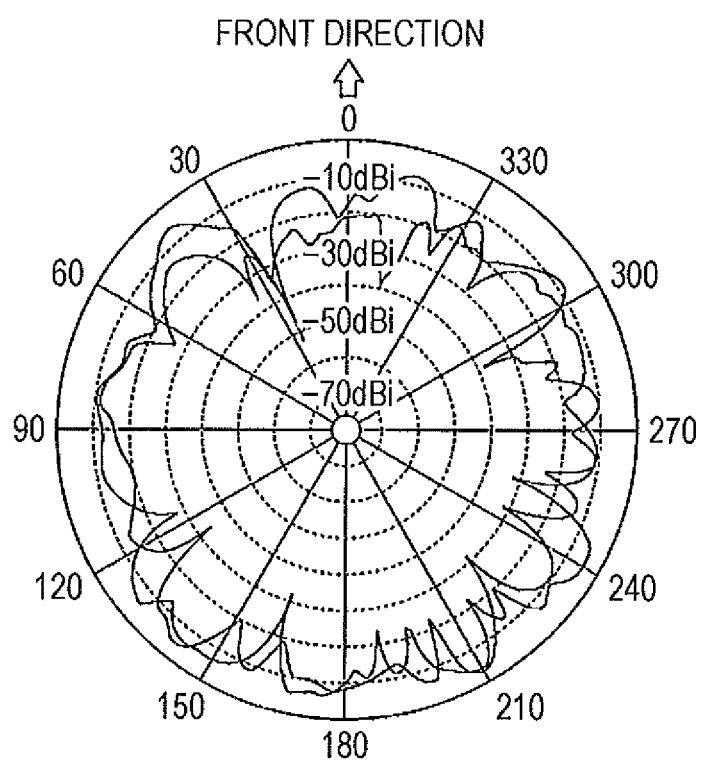
FIG. 3 is a schematic illustration of an example of the antenna gain of a radio module.
Figure 4:
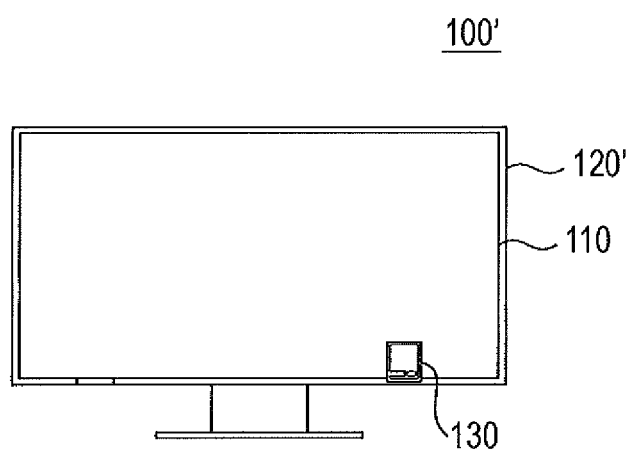
FIG. 4 is a schematic illustration of an external view of another example of an existing television receiver.
Figure 5:
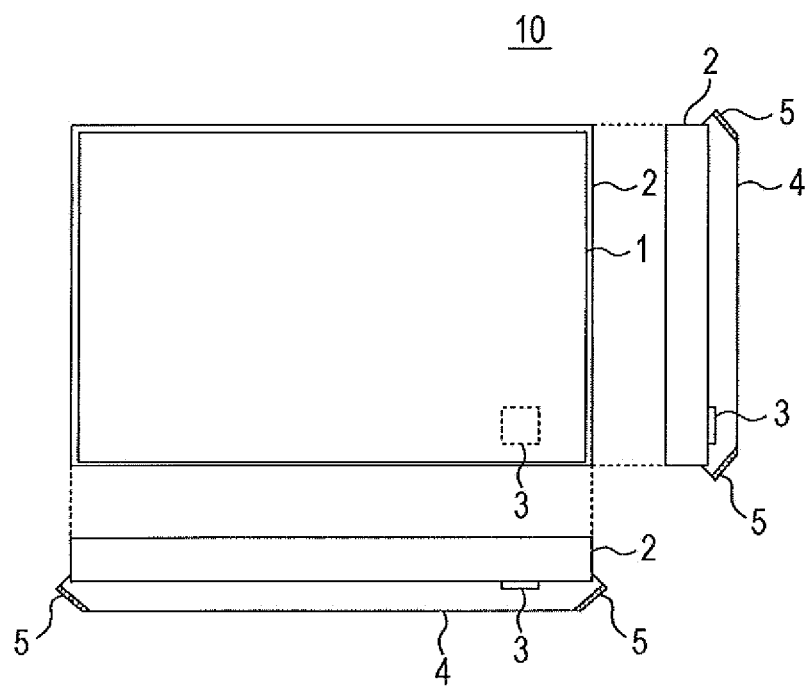
FIG. 5 is a schematic illustration of an external view of an example of a receiving apparatus according to an embodiment of the present invention.

FIG. 5 is an external view of an example of a receiving apparatus 10 according to an embodiment of the present invention. The receiving apparatus 10 includes a display panel 1, a bezel frame 2, and a back cover 4. The display panel 1 serves as a display unit for displaying video on the basis of received radio waves of a broadcast signal. The display panel 1 is formed of a metallic material. The bezel frame 2 is formed of a nonmetallic material, such as plastic. The bezel frame 2 is disposed so as to cover the periphery of the display panel 1.

The back cover 4 is disposed on the back of the bezel frame 2 so as to cover the back of the display panel 1. The back cover 4 is formed of a nonmetallic material, such as plastic. The back cover 4 is formed so that the four sides of the periphery thereof are bent inward.

The housing of the receiving apparatus 10 is formed from the bezel frame 2 and the back cover 4. The housing incorporates a radio module 3 for receiving radio waves transmitted from a transmitting unit, such as a wireless remote controller (hereinafter also referred to as a "wireless remote") and a circuit board (not shown) for performing a predetermined signal process on the received radio waves of a broadcast signal. The radio module 3 can be disposed at any location. However, it is desirable that the radio module 3 be disposed at a location in the vicinity of the circuit board, since the length of an interconnection line that connects the radio module 3 to the circuit board can be decreased.

Note that the back cover 4 does not need to cover the entirety of the back surface of the display panel 1. For example, the back cover 4 can be disposed so as to cover at least part of the back surface of the display panel 1 and incorporate parts, such as the radio module 3 and the circuit board, in the housing.

The bent portion of the back cover 4 on the side of the housing includes a reflector 5. The reflector 5 is formed of a metallic material. The reflector 5 is in the form of, for example, a plate or a conductive tape. The reflector 5 is bonded to the bent portion of the back cover 4 after the back cover 4 is molded. Alternatively, the reflector 5 may be attached using an in-mold process or partial plating when the back cover 4 is molded.

Figure 6:
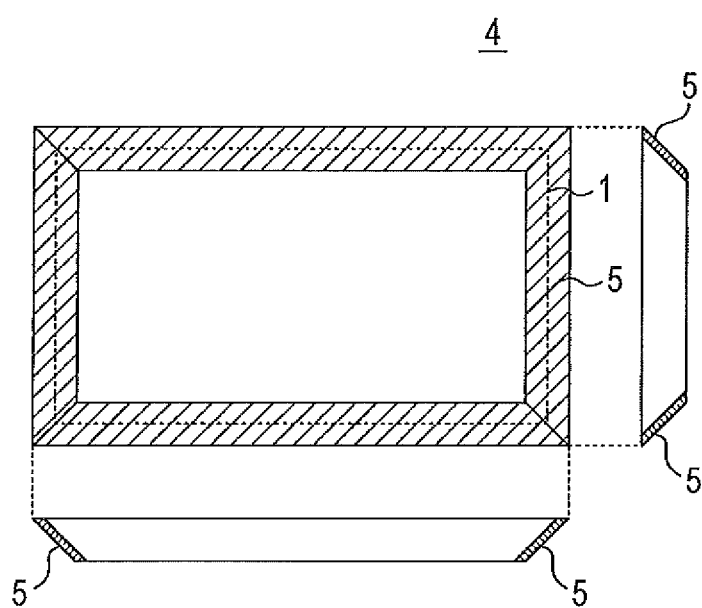
FIG. 6 is a schematic illustration of an external view of an example of the back cover.

FIG. 6 is an external view of an example of the back cover 4 when viewed from the inside of the housing. The periphery of the back cover 4 is bent inward so that the periphery is inclined at a predetermined angle with respect to the back surface portion that is parallel to the display panel 1. It is desirable that the angle of inclination be about 45°±30° in order to maintain the perception performance of the radio module 3 and a better-looking design of the receiving apparatus 10.

It is desirable that the length of the reflector 5 be the same as the length of the back cover 4. However, the length of the reflector 5 may be smaller than the length of the back cover 4 if degradation of the reception performance of the radio module 3 is within an allowable limit. More specifically, for example, the length of the reflector 5 can be about ¼ of the wavelength λ of the radio waves, that is, λ/4. In this way, the radio module 3 can efficiently receive the radio waves transmitted from a wireless remote.

In addition, it is desirable that the width of the reflector 5 be the same as the width of the back cover 4. However, the width of the reflector 5 may be smaller than the width of the back cover 4 if degradation of the reception performance of the radio module 3 is within an allowable limit. Furthermore, the reflector 5 need not be disposed on the entirety of the peripheral portion of the back cover 4. For example, the reflector 5 may be disposed on only one side of the back cover 4 that is the closest to the radio module 3.

As described above, by attaching the reflector 5 in the bent portion of the back cover 4 on the inner side of the housing, the radio waves output from the wireless remote are reflected by the reflector 5 and are directed into the inside of the housing when the wireless remote is operated in front of the receiving apparatus 10.

Figure 7:
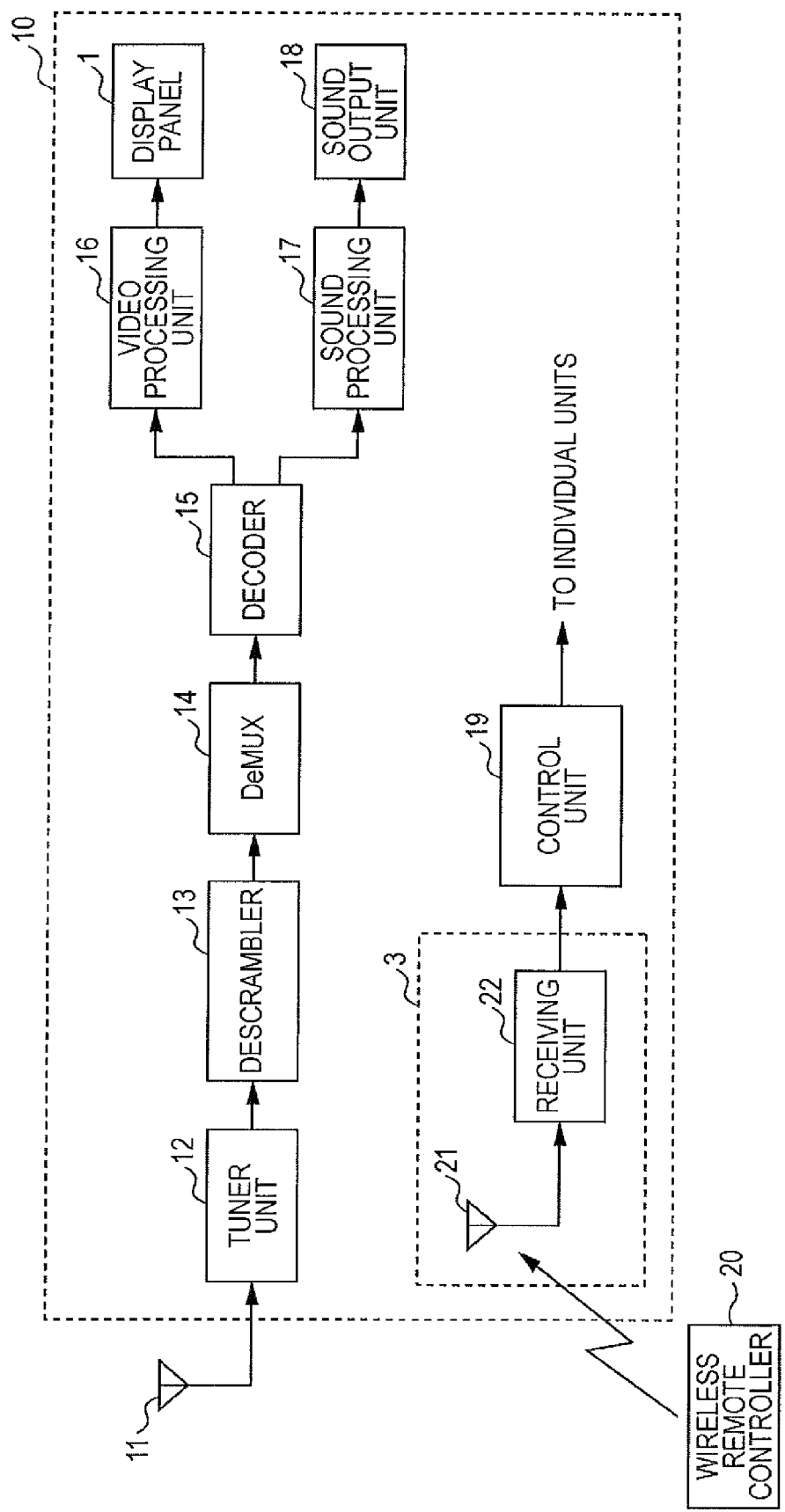
FIG. 7 is a block diagram of the configuration of an example of a receiving apparatus 10 according to an embodiment of the present invention.

FIG. 7 illustrates the configuration of an example of the receiving apparatus 10 according to an embodiment of the present invention. The receiving apparatus 10 includes the radio module 3, a tuner unit 12, a descrambler 13, a demultiplexer (DeMUX) unit 14, a decoder 15, a video processing unit 16, a sound processing unit 17, the display panel 1, a sound output unit 18, and a control unit 19.

The receiving apparatus 10 receives, using an antenna 11 disposed outside the receiving apparatus 10 and connected thereto, radio waves of a digital television broadcast output from broadcast equipment (not shown) and supplies the radio waves to the tuner unit 12. The tuner unit 12 tunes in to a modulated signal of a predetermined frequency originating from the radio waves of a digital television broadcast supplied via an antenna 11. Thereafter, the tuner unit 12 performs predetermined signal processes, such as a demodulation process and an error correction process, on the tuned modulated signal. Thus, the tuner unit 12 outputs a transport stream (TS) to the descrambler 13.

The descrambler 13 performs a descrambling process on the supplied TS as needed and outputs the descrambled TS to the demultiplexer unit 14. The demultiplexer unit 14 performs filtering on the supplied TS on the basis of the value of packet identification (PID) stored in the header portion of a TS packet and used for identifying the packet. In this way, the demultiplexer unit 14 retrieves necessary streams, such as a video stream and an audio stream, from the multiplexed TS and supplies the retrieved streams to the decoder 15.

The decoder 15 performs a decoding process on each of the video stream and the audio stream and outputs a video signal and an audio signal. The decoded video signal and audio signal are supplied to the video processing unit 16 and the sound processing unit 17, respectively.

The video processing unit 16 performs predetermined image processes, such as noise removal, resolution conversion, and frame interpolation, on the supplied video signal and supplies the video signal to the display panel 1. For example, a plasma display panel (PDP) or a liquid crystal display (LCD) can be used as the display panel 1. The sound processing unit 17 performs a predetermined sound process on the supplied audio signal and supplies the audio signal to the sound output unit 18. Thus, the supplied audio signal is output from the sound output unit 18.

A wireless remote controller 20 generates a transmission signal including a command in accordance with an operation performed by a user using operation keys of the wireless remote controller 20. Thereafter, the wireless remote controller 20 transmits the transmission signal to the radio module 3 disposed in the receiving apparatus 10 through radio communication.

The radio module 3 includes a receiving antenna 21 and a receiving unit 22. The receiving antenna 21 receives the transmission signal transmitted from the wireless remote controller 20 and supplies the received transmission signal to the receiving unit 22. The receiving unit 22 performs a predetermined signal process on the transmission signal supplied from the receiving antenna 21 and supplies the transmission signal to the control unit 19.

The control unit 19 controls each unit of the receiving apparatus 10 using a random access memory (RAM) (not shown) as a work memory under the control of a program prestored in a read only memory (ROM) (not shown). In addition, the control unit 19 controls each unit of the receiving apparatus 10 so that the unit operates in accordance with the command included in the signal transmitted from the receiving unit 22.

[Method for Receiving Radio Waves]

According to the embodiment of the present invention, by reflecting the radio waves transmitted from the wireless remote controller 20 by the reflector 5 disposed on the back cover 4, the radio waves can be efficiently received by the radio module 3.

Figure 8A:
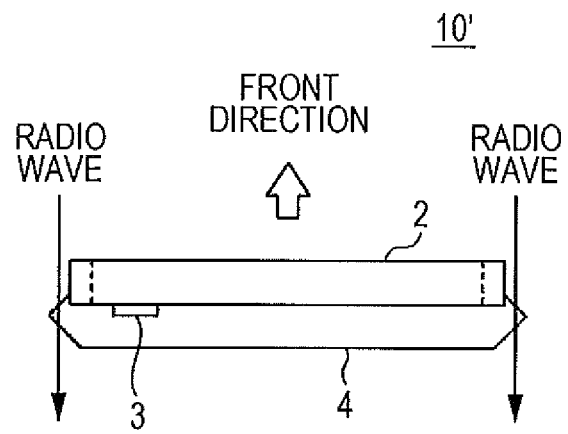
FIG. 8 is a schematic illustration of a method for receiving radio waves when a reflector is not attached.
Figure 8B:
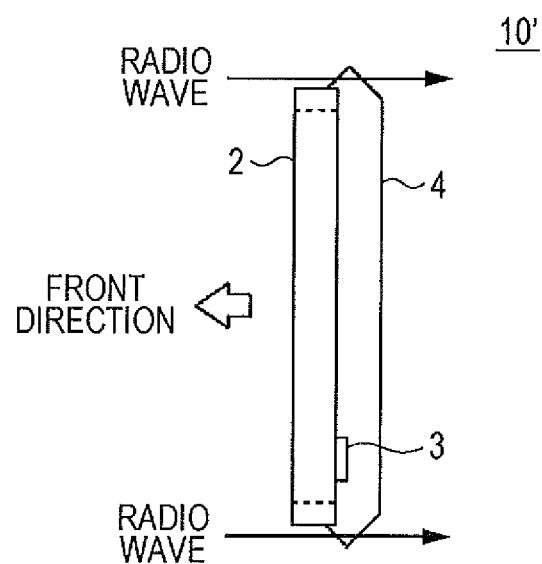

For ease of understanding of the embodiment of the present invention, description is made for the case in which the reflector 5 is not provided in the back cover 4 first. FIGS. 8A and 8B are a top view and a side view of a receiving apparatus 10' that does not include the reflector 5 on the back cover 4 thereof. When radio waves are transmitted from the front of the receiving apparatus 10', the radio waves pass through the back cover 4 that is formed of a nonmetallic material. Therefore, the radio waves do not travel in a direction extending towards the radio module 3. As a result, it is difficult for the radio module 3 to receive the radio waves.

Figure 9A:
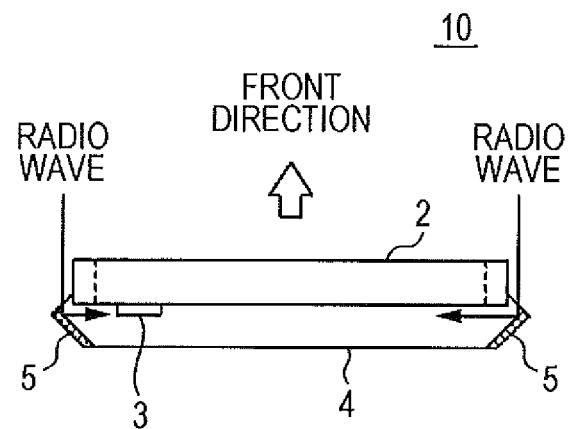
FIG. 9 is a schematic illustration of a method for receiving radio waves when a reflector is attached.
Figure 9B:
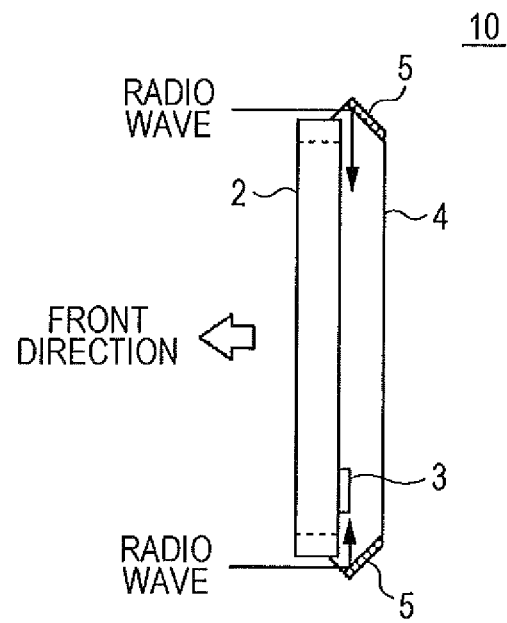

The case in which the reflector 5 is disposed in the back cover 4 is described next. FIGS. 9A and 9B are a top view and a side view of the receiving apparatus 10 that includes the reflector 5 on the back cover 4 thereof. When radio waves are transmitted from the front of the receiving apparatus 10, the radio waves are reflected by the reflector 5 and, therefore, the radio waves are directed to the inside of the housing without passing through the back cover 4. Accordingly, the radio waves transmitted in the front direction can be received by the radio module 3.

Figure 10:
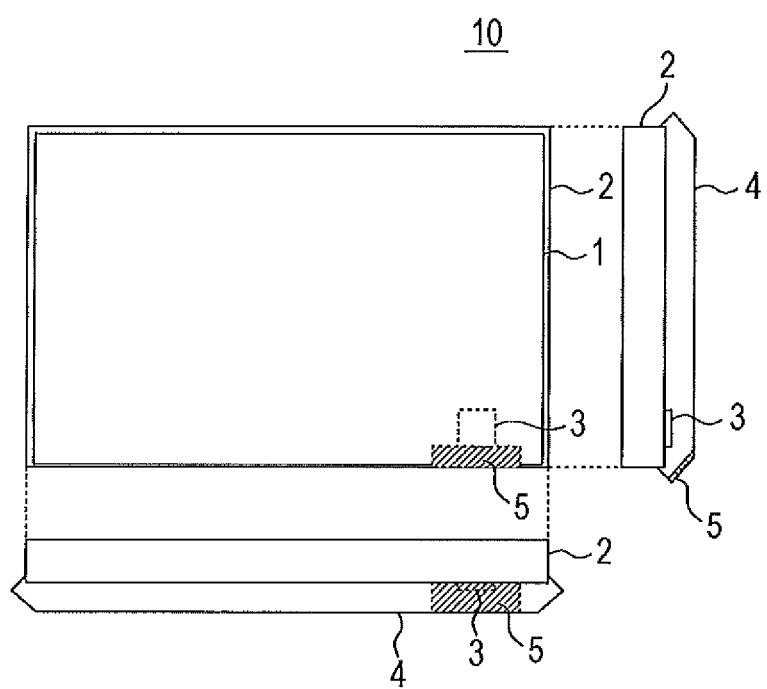
FIG. 10 is a schematic illustration of an external view of an example of a receiving apparatus having a back cover part of which has a reflector attached thereto.

FIG. 10 illustrates the case in which the reflector 5 is attached to part of the back cover 4. In this case, a metal tape serving as the reflector 5 is attached to one of the four sides of the back cover 4 that is the closest to the radio module 3 on the side of the bottom surface. The metal tape is 65 mm in length and 20 mm in width. The metal tape is attached to the vicinity of the radio module 3.

Figure 11:
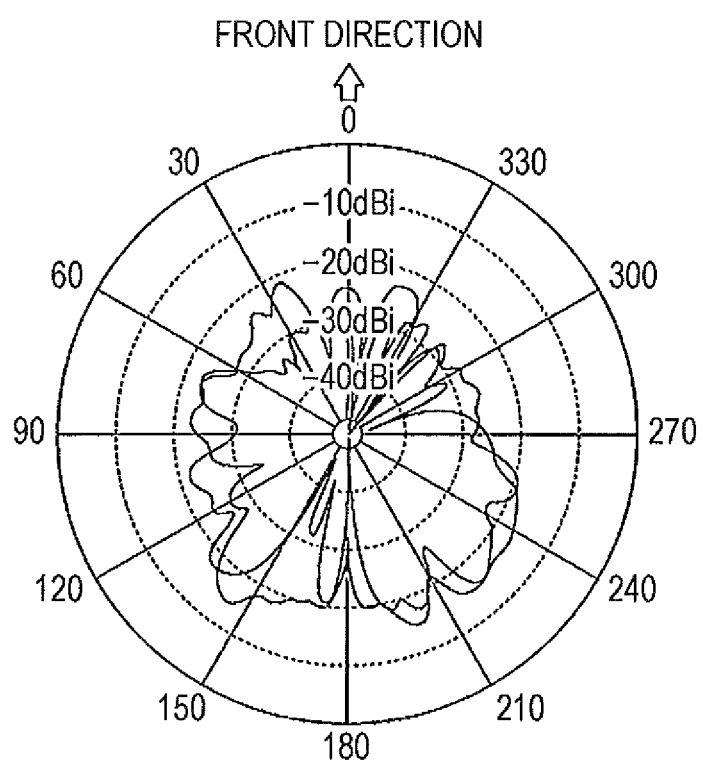
FIG. 11 is a schematic illustration of an example of the antenna gain of a radio module obtained when a reflector is not attached.
Figure 12:
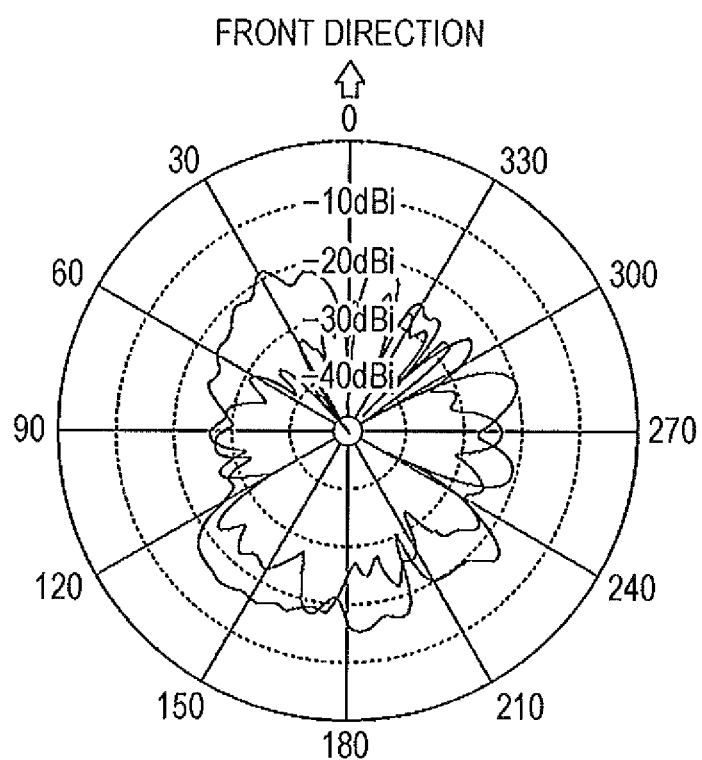
FIG. 12 is a schematic illustration of an example of the antenna gain of a radio module obtained when a reflector is attached.

FIG. 11 illustrates the antenna gain of the radio module 3 obtained when a metal tape shown in FIG. 10 is not attached. FIG. 12 illustrates the antenna gain of the radio module 3 obtained when a metal tape shown in FIG. 10 is attached. In the graphs shown in FIGS. 11 and 12, the angle in the circumferential direction represents a direction of the radio module 3. More specifically, a position at an angle of 0° represents the front direction of the receiving apparatus 10. A position at an angle of 180° represents the back direction of the receiving apparatus 10. In addition, the radial direction of the circle represents the level of the antenna gain, which indicates that the antenna gain increases from the inner peripheral side towards the outer peripheral side.

As shown in FIGS. 11 and 12, by attaching a metal tape, the antenna gain in the back direction is increased by about 3 dB, and the communication distance is increased by about 1.4 times. For example, when the receiving apparatus 10 is a television receiver and if the communication distance between the receiving apparatus 10 and the wireless remote controller 20 is about 3 m, the communication distance is increased to about 4.2 m. Accordingly, the user can get much benefit when they operate the wireless remote controller 20 in a room.

In this way, when the reflector 5 is attached to the back cover 4, the receiving apparatus 10 can receive radio waves more efficiently than the receiving apparatus 10 without the reflector 5.

However, if radio waves are transmitted in a direction at an angle to the front direction of the receiving apparatus 10, the display panel 1 is located in front of the reflector 5 in a direction in which the radio waves travel and, therefore, serves as a shielding material. Thus, the radio waves cannot be reflected by the reflector 5 and, therefore, cannot be received by the radio module 3. To address such an issue, according to the embodiment of the present invention, the reflector 5 is provided so that radio waves traveling in a direction at an angle to the front direction are reflected using diffraction based on Snell's law and, thus, the radio module 3 can receive the radio waves.

Figure 13:
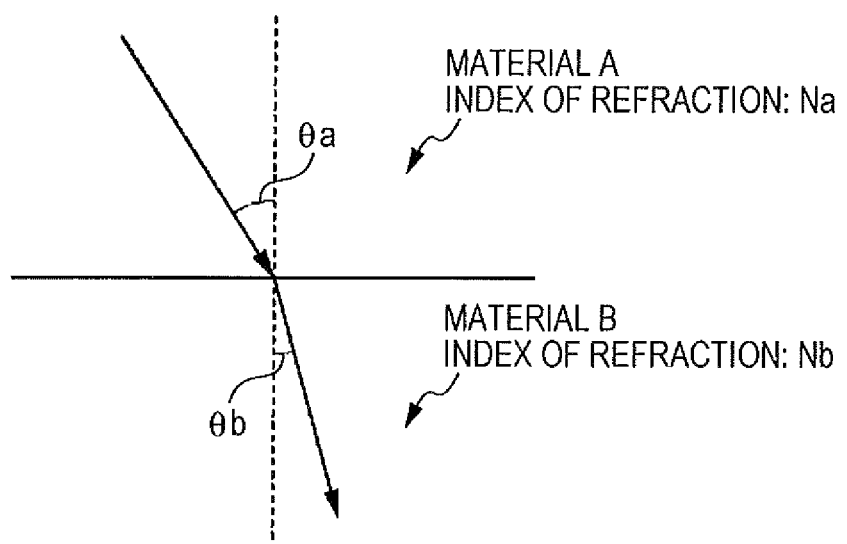
FIG. 13 is a schematic illustration of Snell's law.

As shown in FIG. 13, let $\theta_a$ and $\theta_b$ denote the angles to the perpendicular direction of a boundary surface between materials A and B having different indices of refraction, and let Na and Nb denote the indices of refraction. Then, the following relationship is satisfied by Snell's law:

$$\sin \theta_a / \sin \theta_b = Nb/Na \quad (1)$$

In addition, when the relative permittivity of the material A is about 1 and the relative permittivity of the material B is $\epsilon$ (>1), the index of refraction Na of the material A is 1 and the index of refraction Nb of the material B is $\sqrt{\epsilon}$. Accordingly, if the index of refraction of the material B is higher than 1, the radio wave incident on the material A diffracts in accordance with the above-described equation (1). Thus, the angle $\theta_b$ of the radio wave that travels through the material B is smaller than the angle $\theta_a$ of the radio wave that travels through the material A.

Figure 14:
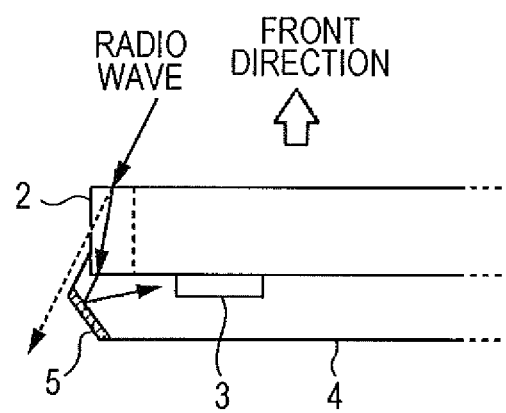
FIG. 14 is a schematic illustration of a method for receiving radio waves using Snell's law.

The case in which a radio wave is transmitted in a direction at an angle to the receiving apparatus 10 is discussed below using such diffraction based on Snell's law. As shown in FIG. 14, a radio wave transmitted in a direction at an angle to the receiving apparatus 10 is incident on the bezel frame 2. According to the embodiment of the present invention, the bezel frame 2 is made of a material such as plastic and, therefore, the relative permittivity is higher than 1. Thus, the radio wave incident on the bezel frame 2 diffracts in accordance with Snell's law when the radio wave travels through the bezel frame 2 and, therefore, the traveling direction is changed. The radio wave traveling in the changed direction is reflected by the reflector 5 and is directed into the inside of the housing. In this way, the radio module 3 can receive the radio wave transmitted in a direction at an angle to the front direction of the receiving apparatus 10.

Note that if the relative permittivity of the bezel frame 2 is the same as the relative permittivity of the air, the radio wave does not diffract when passing through the bezel frame 2 and travels in a direction indicated by a dotted arrow. Therefore, the radio wave transmitted in a direction at an angle to the front direction cannot be reflected by the reflector 5.

As described above, according to the embodiment of the present invention, by disposing the reflector 5 on the inner side of the housing of the back cover 4, radio waves for radio communication transmitted in the front direction of the receiving apparatus 10 and a direction at an angle to the front direction can be more efficiently received.

In addition, since the reflector 5 is disposed on the inner side of the housing of the back cover 4, the appearance of the receiving apparatus 10 is not changed. Therefore, the reception performance can be increased without sacrificing the aesthetic look of the receiving apparatus 10.

Furthermore, according to the embodiment of the present invention, since radio communication is performed using the reflector 5, the position at which the radio module 3 is attached can be freely determined. For example, the radio module 3 can be attached to the vicinity of a circuit board. Therefore, the length of an interconnection line extending between the circuit board and the radio module 3 can be decreased. Thus, the manufacturing cost of the receiving apparatus 10 can be decreased. Furthermore, since the interconnection line does not function as an antenna, unwanted radiation can be reduced.

Figure 15:
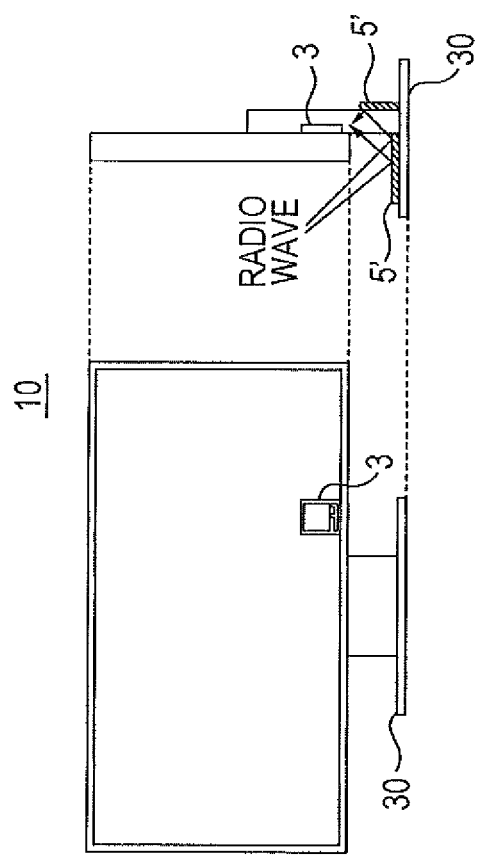
FIG. 15 is a schematic illustration of an example in which a reflector is attached to a stand unit.

While the present invention has been described with reference an embodiment of the present invention, the present invention is not limited to the above-described embodiment. Various modifications and applications can be made without departing from the spirit of the claims of the present invention. In the above description of this example, the reflector 5 is attached to the bent portion of the back cover 4. However, the application is not limited thereto. The reflector 5 can be attached to another portion if the reception performance of the radio module 3 can be increased. More specifically, for example, as shown in FIG. 15, a reflector 5' may be attached to a stand unit 30 that is used for installing the receiving apparatus 10. By disposing a reflector 5' in the stand unit 30, the radio waves can be efficiently received by the radio module 3, as in the case in which the reflector 5 is disposed on the back cover 4.

In addition, while this example has been described with reference to the case in which a signal is received from a wireless remote, the present invention is not limited thereto. For example, the present invention is applicable even when the tuner unit 12 provided to the receiving apparatus 10 is separated from the receiving apparatus 10, and AV data are communicated between the tuner unit 12 and the receiving apparatus 10 through wireless communication.

REFERENCE SIGNS LIST

1 DISPLAY PANEL
2 BEZEL FRAME
3 RADIO MODULE
4 BACK COVER
5, 5' REFLECTOR
10, 10' RECEIVING APPARATUS
20 WIRELESS REMOTE CONTROLLER
21 RECEIVING ANTENNA
22 RECEIVING UNIT
30 STAND UNIT

The invention claimed is:

1. A receiving apparatus comprising:
a display panel configured to display video;
a back cover configured to cover at least part of a back surface of the display panel, the back cover having at least part of a peripheral portion that is bent inward to form a bent portion;
a receiving unit disposed on a front surface of the back cover, the receiving unit receiving radio waves used for wireless communication and transmitted from outside; and
a reflector disposed on the bent portion of the back cover, the reflector reflecting the radio waves transmitted from the outside and directing the radio waves to the receiving unit,
wherein a width of the reflector is the same as a width of the back cover.

2. A receiving apparatus comprising:
a display panel configured to display video;
a back cover configured to cover at least part of a back surface of the display panel, the back cover having at least part of a peripheral portion that is bent inward;
a receiving unit disposed on a front surface of the back cover, the receiving unit receiving radio waves used for wireless communication and transmitted from the outside; and a reflector disposed in the vicinity of a bent portion of the back cover, the reflector reflecting the radio waves transmitted from the outside and directing the radio waves to the receiving unit, wherein a length of the reflector is greater than or equal to $\lambda/4$, where $\lambda$ represents a wavelength of the radio waves.

3. A receiving apparatus comprising:

a display panel configured to display video;

a back cover configured to cover at least part of a back surface of the display panel;

a receiving unit disposed on a front surface of the back cover, the receiving unit receiving radio waves used for wireless communication and transmitted from outside;

a reflector to reflect the radio waves transmitted from the outside and direct the radio waves to the receiving unit; and a stand unit configured to support the display panel, wherein the reflector is attached to the stand unit, and wherein a length of the reflector is greater than or equal to $\lambda/4$, where $\lambda$ represents a wavelength of the radio waves.

4. A receiving apparatus comprising:

a display panel configured to display video;

a back cover configured to cover at least part of a back surface of the display panel, the back cover having at least part of a peripheral portion that is bent inward to form a bent portion;

a receiving unit disposed on a front surface of the back cover, the receiving unit receiving radio waves used wireless communication and transmitted from outside; and a reflector disposed on the bent portion of the back cover, the reflector reflecting the radio waves transmitted from the outside and directing the radio waves to the receiving unit, wherein a length of the reflector is the same as a length of the back cover.

5. The receiving apparatus according to claim 2, further comprising:

a bezel frame formed of a nonmetallic material, the bezel frame covering the peripheral portion of the display panel, wherein the radio waves are directed to the receiving unit in accordance with a traveling direction of the radio waves changed by diffraction occurring when the radio waves pass through the bezel frame.

6. The receiving apparatus according to claim 2, wherein a bent portion of the back cover formed by the at least part of the peripheral portion that is bent inward is formed on at least one of four sides of the peripheral portion.

7. The receiving apparatus according to claim 6, wherein the bent portion of the back cover is formed on a side of the peripheral portion that is closest to the receiving unit.

8. The receiving apparatus according to claim 6, wherein a bent angle of the bent portion of the back cover is $45°\pm30°$.

\* \* \* \* \*